April 18, 1939.  J. J. SITKIN ET AL  2,155,334
METHOD OF AND APPARATUS FOR TAKING DENTAL IMPRESSIONS
Filed Feb. 13, 1936
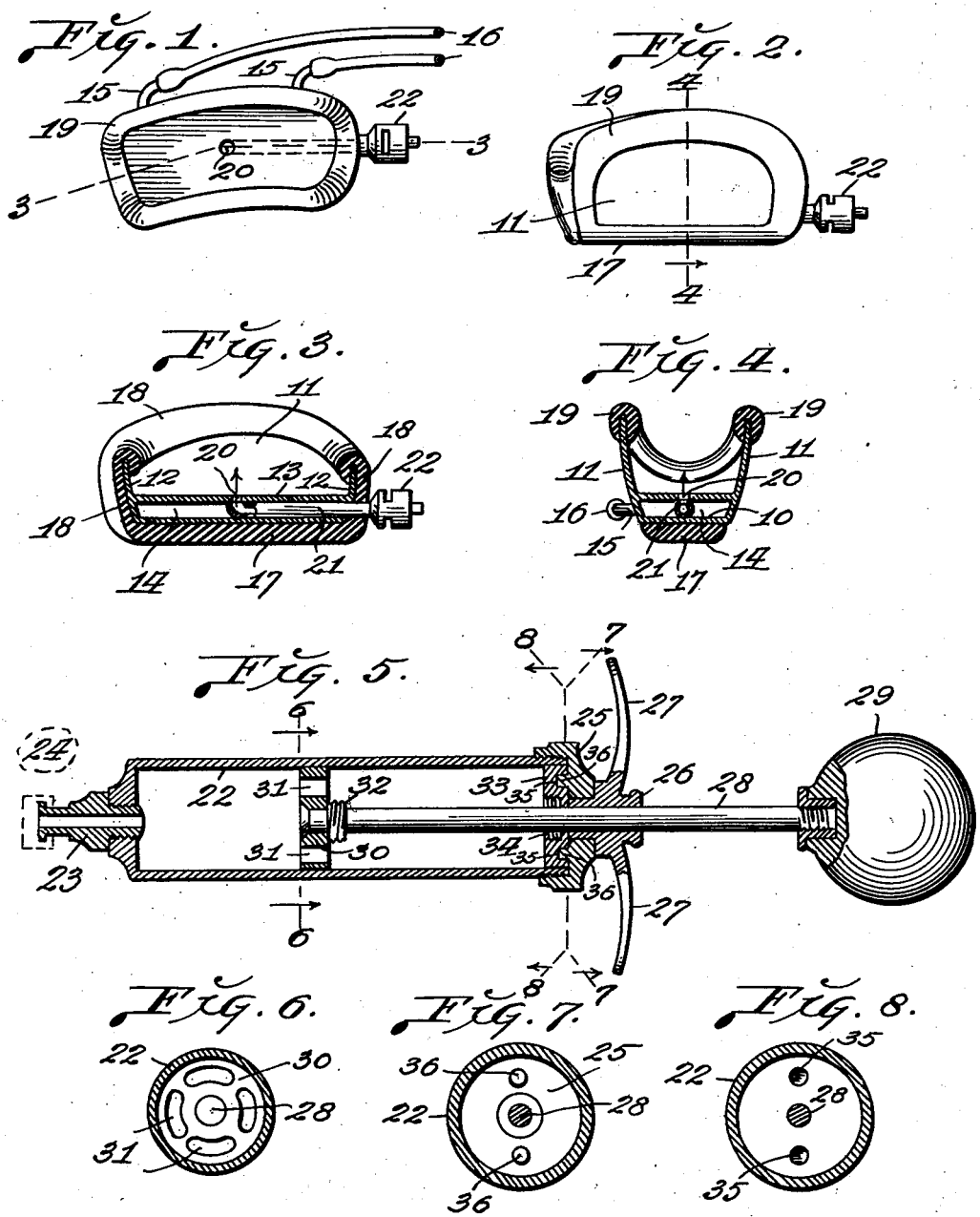
INVENTORS,
JOHN J. SITKIN AND
FREDERICK W. ARCHER.
BY Martin P. Smith ATTY.

Patented Apr. 18, 1939

2,155,334

UNITED STATES PATENT OFFICE 2,155,334

METHOD OF AND APPARATUS FOR TAKING DENTAL IMPRESSIONS

John J. Sitkin and Frederick W. Archer, Los Angeles, Calif.

Application February 13, 1936, Serial No. 63,679

1 Claim. (Cl. 32—17)

Our invention relates to a method of, and apparatus for reproducing the minute details of teeth, their preparations, relationship and surrounding soft tissues of the human mouth for use in the production of metal and porcelain inlays, bridges and removable bridges, and the principal object of our invention is to provide a relatively simple, easily practiced and more efficient method, that will be effective in the saving of time to both patient and dentist; and to obtain a degree of accuracy which can not be obtained under the present methods.

Our method is characterized by the subjecting of a hydro-collodial substance, or other elastic compounds, to heat and pressure and then forcing the compound which has been rendered plastic by the heat, into a water-cooled tray, which latter is held in position by pressure developed by the closing of the jaws of the patient upon an elastic block that extends over the top of the tray around the marginal edge thereof, so that the compound is hermetically sealed around the teeth and area encompassed by the tray, into which the compound is forced under pressure. After the plastic compound has been forced into the chamber within the tray around the teeth and adjacent surfaces, said compound is cooled as a result of circulation of cold water through the water chamber in the tray, after which the tray and the cooled material therein is removed from the mouth wthout distortion of the compound so that a perfect reproduction of the teeth and the surrounding tissues of the jaw is obtained.

With the foregoing and other objects in view, our invention consists in certain novel features of construction and arrangement of parts that will be hereinafter more fully described and claimed and illustrated in accompanying drawing in which:

Fig. 1 is a top plan view of the water-cooled tray utilized in practicing our improved method.

Fig. 2 is a side elevational view of the tray.

Fig. 3 is a vertical longitudinal section taken on the line 3—3 of Fig. 1.

Fig. 4 is a cross-section taken on line 4—4 of Fig. 2.

Fig. 5 is a longitudinal section taken through the center of a syringe that is utilized for forcing the hydro-collodial substance or other elastic compound, into the tray under pressure.

Fig. 6 is a cross-section taken on the line 6—6 of Fig. 5.

Fig. 7 is a cross-section taken on the line 7—7 of Fig. 5.

Fig. 8 is a cross-section taken on the line 8—8 of Fig. 5.

Referring by numerals to the accompanying drawing which illustrates a relatively simple apparatus for practicing our improved method, 10 designates the bottom plate or wall of a tray and formed integral therewith, and projecting upwardly from the edges thereof are side walls 11 and end walls 12. The tray thus constructed may be of such size and contour as to be conveniently used for taking posterior upper and lower impressions for anterior impressions or for a combination of posterior and anterior work. The upper edges of the side walls 11 are slightly arched with the highest portions in the centers, and the upper edges of the end walls 12 are indented or curved downwardly so as to fit snugly against the teeth and surrounding gum tissues to which the tray is applied.

Positioned within the tray a short distance above and parallel with the bottom plate or wall 10 is a partition 13, the edges of which are secured to the side and end walls and thus a shallow chamber 14 is formed in the bottom of the tray for the circulation of water used in cooling the tray.

Secured to and projecting outwardly from one of the side walls of the tray and communicating with the chamber 14, are small tubular elbows 15, which provide means for the cooling water to enter and discharge from chamber 14, and connected to these elbows are flexible tubes 16 that lead from a suitable source of cooling fluid supply and a discharge therefor.

Secured to the under side of bottom 10 is a thick layer 17 of rubber, or elastic composition, of which rubber is the principal ingredient, and extending upwardly from this layer 17 on the outer faces of the end walls 12 are layers 18 of the same material. Overlying the upper edges of the side and end walls of the tray are heavy strips 19 of rubber or rubber composition, and these strips are formed integral with the end sections 18. The layer 17 provides a biting surface to be engaged by the teeth of the patient when the tray is positioned for use, and the heavy elastic strip 19 on the upper edges of the side and end walls engages with pressure against the teeth and gum tissues surrounding the area of which an impression is to be taken, thus sealing the chamber encompassed by the strip 19, and preventing escape of the plastic compound that is forced under pressure into the tray.

Formed in the center of the partition 13 is an aperture 20 through which the plastic compound enters the chamber within the tray and extending through one of the end walls 12, and positioned between the bottom 10 and partition 13 is a tube 21, the inner end of which communicates with aperture 20.

Secured to the outer end of tube 21, which is beyond one of the end walls 18, is a socket 22 that is adapted to receive the nozzle of a syringe utilized for forcing the plastic compound into the tray.

In Figs. 5 to 8 inclusive, I have shown a simple form of syringe for mixing the plastic compound and for forcing the same under pressure into the tray. This syringe includes a cylinder 23 and projecting from the forward end thereof is a nozzle 23 that is adapted to engage in socket 22.

A removable cap or closure 24, shown in dotted lines in Fig. 5, is provided for the nozzle 23. Removably positioned on the rear end of the cylinder 22 is a cap 25, and carried thereby is a tubular member 26 provided with a pair of oppositely arranged handles 27. Arranged to slide freely through tubular member 26 is a piston rod 28, the outer end of which carries a handle preferably in the form of knob 29. Carried by the end of the rod 28 within cylinder 22, is a disk 30 provided with a plurality of apertures 31, and a short portion of the rod immediately to the rear of this disk 30 is externally threaded as designated by 32. Loosely mounted on the rod 28 within cylinder 22 between the disk 30 and the cap 35, is a disk 33, and formed in the center thereof is a threaded recess 34 that is adapted to receive the threaded portion 32 of rod 28. Formed in the face of disk 33 adjacent to the cap 25 are recesses 35 that are adapted to receive studs 36 that project from the inner face of cap 25.

In practicing our improved method with the apparatus as herein described, the cap 24 is applied to the nozzle 23, and cap 25 is disengaged from the rear end of the cylinder, and together with disk 33 said cap is moved to its rearward movement of limit on rod 28. A suitable quantity of hydro-collodial substance, or other elastic compound, is now delivered into the cylinder, after which the cap 25 carrying disk 33 is screw-seated on the rear end of the cylinder. The cylinder of the syringe is now subjected to sufficient heat to soften the hydro-colloidal substance, or other elastic compound, and when the same has become sufficiently plastic, it may be thoroughly mixed by reciprocating the piston rod 28 carrying the disk 30, and the latter being provided with the apertures 31 to permit the compound to pass from one side of the disk to the other as the same is reciprocated within the cylinder. After being thus thoroughly mixed, the piston rod 28 is drawn rearwardly until disk 30 is positioned adjacent disk 33 and the rod is now rotated so as to engage the threaded portion 32 in the threaded recesses 34, during which operation disk 33 is held against rotation by the engagement of the studs 36 in the recesses 35.

Thus disk 33 is secured to rod 28 in position to close the aperture 31 in disk 30; consequently, when the rod carrying the two disks is moved forwardly through the cylinder and the cap 24 is removed from nozzle 23, the plastic compound in front of disk 30 will be forced out through nozzle 23.

The tray is properly positioned in the patient's mouth with the socket 23 forwardly presented, and jaws of the patient are moved toward each other, with the result that the pressure exerted upon the elastic layer 17 will force the elastic sealing strip 19 against the teeth and gum tissues surrounding the area of which the impression is to be taken so as to effectively seal the chamber above the partition 13 within the tray.

The end of nozzle 23 is now applied to socket 22 and rod 28 carrying the disks 30 and 33 are moved forwardly through the cylinder, and the hydro-colloidal substance, or other elastic compound in plastic condition, will be forced under pressure from nozzle 23 through tube 21, and this material will discharge upwardly through aperture 20 and completely fill the chamber within the tray so as to obtain an exact reproduction of the minute details of the teeth, their preparations, relationship and surrounding soft tissues.

After the chamber within the tray has been filled with the plastic compound as just described, cooling water is caused to circulate through the tubes 16 and the chamber 14 in the lower portion of the tray, thereby cooling the material and causing the same to become set, and after such action, the syringe is disengaged from the tray, after which the latter containing the impression is removed from the patient's mouth.

Among the specially desirable features of my invention are, the construction of the tray which enables the compound receiving chamber therein to be effectively sealed at all points while the compound is being forced under pressure into the tray, the provision of the layer of elastic material on the under face of the tray which layer functions as a cushion, adapted to be engaged by the teeth of the jaw, opposite from the teeth or area of which the impression is being taken and further, the syringe for forcing the compound into the tray under pressure and the particular construction of the syringe, whereby the compound may be heated and thoroughly mixed prior to its being forced into the tray.

Our improved method provides a material saving of time as compared to the methods now in general use, and the effective sealing of the edges of the tray to the surrounding tissues of the mouth provides for maximum accuracy in the reproduction of the details of the teeth and the surrounding soft tissues.

Thus it will be seen that we have provided a relatively simple and effective method and apparatus for taking impressions of teeth and surrounding tissues in order to conveniently and accurately produce desired metal and porcelain inlays, bridges and removable bridges. It will be understood that minor changes in the size, form and construction of the tray and syringe may be made and substituted for those herein shown and described without departing from the spirit of our invention, the scope of which is set forth in the appended claim.

We claim as our invention:

A method of taking impressions of teeth and surrounding gum tissues, comprising enclosing at least one tooth with a rigid impression tray having a substantially air tight fit with said tissues, and then forcing an elastic compound in fluid form into said tray under pressure until said tooth and said surrounding gum tissues are completely covered and said compound is forced into intimate engagement with every exposed surface of said tooth and tissue, permitting said compound to solidify into its normal solid elastic state, and removing the same and said tray from the mouth.

JOHN J. SITKIN.
FREDERICK W. ARCHER.